United States Patent [19]
Kornylak et al.

[11] 3,994,648
[45] Nov. 30, 1976

[54] ENDLESS CONVEYOR SPACING CONTROL FOR CONTINUOUS MOLDING

[75] Inventors: Andrew T. Kornylak; Charles P. Tabler, both of Hamilton, Ohio

[73] Assignee: Kornylak Corporation, Hamilton, Ohio

[22] Filed: June 25, 1974

[21] Appl. No.: 483,040

[52] U.S. Cl. .............................. 425/150; 425/224; 425/371; 425/817 C
[51] Int. Cl.² ........................................ B29D 27/04
[58] Field of Search ........... 425/135, 140, 141, 149, 425/150, 162, 371, 372, 4 C, 817 C, 224, 329, 115, 471; 164/4, 154; 264/40; 198/40, 162, 165

[56] References Cited
UNITED STATES PATENTS

| | | | |
|---|---|---|---|
| 2,561,169 | 7/1951 | Bickelhaupt | 425/149 |
| 3,391,425 | 7/1968 | Gardner | 425/150 |
| 3,568,245 | 3/1971 | Jetzer | 425/372 X |
| 3,706,516 | 12/1972 | Kisteneich et al. | 425/371 X |
| 3,784,340 | 1/1974 | Kerttula et al. | 425/371 X |
| 3,836,298 | 9/1974 | Ernst | 425/371 X |
| 3,850,560 | 11/1974 | Farrell | 425/150 |
| 3,885,901 | 5/1975 | Reiners | 425/371 |

Primary Examiner—Francis S. Husar
Assistant Examiner—Mark Rosenbaum
Attorney, Agent, or Firm—Beall & Jeffery

[57] ABSTRACT

Preferably for use in the production of continuous lengths of rigid foam, a molding machine employs opposed endless conveyor belts having adjacent linear runs forming therebetween a molding zone. Each of the conveyors is supported for movement toward and away from the other conveyor, and one of the conveyor supports is made up of a plurality of sections hingedly connected together to locally yield to a lump or other discontinuity in the product being produced. Double acting expansible chambers are provided to drivingly interconnect the conveyor supports for separating the conveyors, permitting the conveyors to come together, and for clamping the conveyors together under a pressure sufficient to resist the foaming pressure, with a space between the conveyors being maintained during molding by adjustable spacer blocks. Micro-switches sense the minimum spacing to permit the clamping pressure to be applied and to release the clamping pressure when a lump or other discontinuity moves a conveyor section off of its spacer block.

18 Claims, 3 Drawing Figures

ENDLESS CONVEYOR SPACING CONTROL FOR CONTINUOUS MOLDING

BACKGROUND OF THE INVENTION

Opposed endless conveyors for the continuous molding of rigid foam sheet material are known and have been mounted for movement towards and away from each other for various purposes, for example to vary the thickness of the product, to provide sufficient space and access between the conveyors for maintenance and inspection. Molding pressures for rigid foam sheet material can normally be as high as 3 to 5 pounds per square inch, which pressure produces considerable forces upon the conveyor structure. Therefor, the conveyors must be rigidly mounted, but this rigidity can damage the structure when abnormal pressures are applied, for example locally applied due to a lump or the like.

If screw or other mechanical adjustments were provided for adjusting the conveyors relative to each other, there would be no provision for yielding to the above-mentioned abnormalities, and further the uniform adjustment would be difficult due to accumulated tolerances along the conveyor length, for example, if a chain were used to drive a plurality of screws, the tolerance in the chain would inheritly mean that one end would receive more adjustment than the other end in one direction of adjustment.

The patent to Jetzer U.S. Pat. No. 3,568,245, issued Mar. 9, 1974 employs single acting piston cylinder arrangements for producing a pneumatic clamping pressure urging the conveyor belts together in the molding zone, with minimum spacing being provided by screw adjustment abutments.

SUMMARY OF THE INVENTION

The present invention relates to the continuous molding of rigid synthetic resin foam sheet in a molding zone formed by two endless conveyor belts that have linear runs parallel and adjacent each other in the molding zone and driven in opposite directions so that the linear runs travel in a common direction through the molding zone. Each of the conveyors is mounted on a support, and the supports are mounted for movement towards and away from each other.

The present invention employs a plurality of expansible chambers on each side of the molding zone drivingly interconnecting the conveyor supports. The expansible chambers are double acting so that fluid pressure applied to one side will separate the conveyors for maintenance access and the like, venting of this pressure through a restrictive orifice or other control will permit the controlled approach of the conveyors to each other to their desired minimum gap as determined by rigid spacers, and supplying pressure to the other sides of the double acting expansible chamber means will clamp the conveyors together with a pressure sufficient to resist the foaming pressure within the molding zone. A plurality of micro-switches are arranged so as to sense the minimum spacing for permitting the application of clamping pressure only after the spacer blocks are engaged, and further, the micro-switches will sense an abnormal pressure rise that will force the conveyors apart against the action of the clamping pressure. One of the conveyor supports is subdivided into a plurality of relatively moveable sections, with each section being provided with expansible chambers, spacers and sensers; signal means may be associated with each of the sensors so that an abnormality may be accurately located.

BRIEF DESCRIPTION OF THE DRAWING

Further objects, features and advantages of the present invention will become more clear from the following detailed description of a preferred embodiment as shown in the attached drawing, wherein.

DETAILED DESCRIPTION OF THE PREFERRED EMBODIMENT

The features of the present invention may be applied broadly to any type of molding equipment wherein two opposed molding surfaces are moved together to form a molding zone and clamped to resist the pressures of molding, but more narrowly the features of the present invention are most advantageous when employed with molding apparatus for the production of rigid synthetic foam sheets in a continuous manner with opposed endless conveyor belts being driven and supported with linear runs in the same direction forming the opposed molding zone surfaces.

Figure 1:
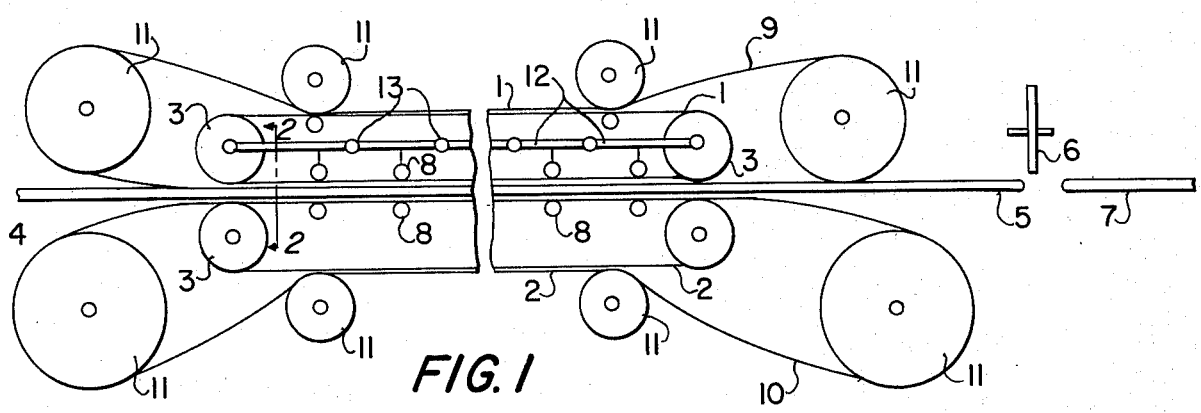
FIG. 1 is a schematic side elevation view of molding apparatus employing the features of the present invention.

Such apparatus is broadly shown in side elevation in FIG. 1, wherein: there are provided two endless conveyor belts, which may be of the type shown in the patent to Kornylak U.S. Pat. No. 3,082,861, issued Mar. 26, 1963. The upper conveyor belt 1 and the lower conveyor belt 2 are each supported and driven by end wheels, sprockets, or the like 3 in the opposite directions so as to have opposed linear runs forming a molding zone into which a synthetic resin is deposited by suitable means, such as an injection nozzle 4 so as to foam and to cure within the molding zone and exit as a rigid synthetic continuous length of foam material 5, which will thereafter be cut by a suitable cutter 6 into desired lengths 7. The linear runs of the conveyor belts are supported within the molding zone by a plurality of anti-friction means, which are schematically represented in FIG. 1 by rollers 8. If desired, the conveyors within the molding zone may be lined by a continuous belt 9, 10, respectively, which belt is supported by a plurality of guide rollers 11.

The lower conveyor structure is supported by a generally rigid support, not shown, which will rigidly interconnect all of the various guide rollers and the like as one unit for vertical movement toward and away from the upper conveyor structure that is interconnected by a similar support. The support for the upper conveyor structure, particularly for the conveyor belt 1, will comprise a plurality of support beam sections 12 that are hinged together at 13, or otherwise interconnected for relative vertical movement, for a purpose to be apparent in the following description.

Figure 2:
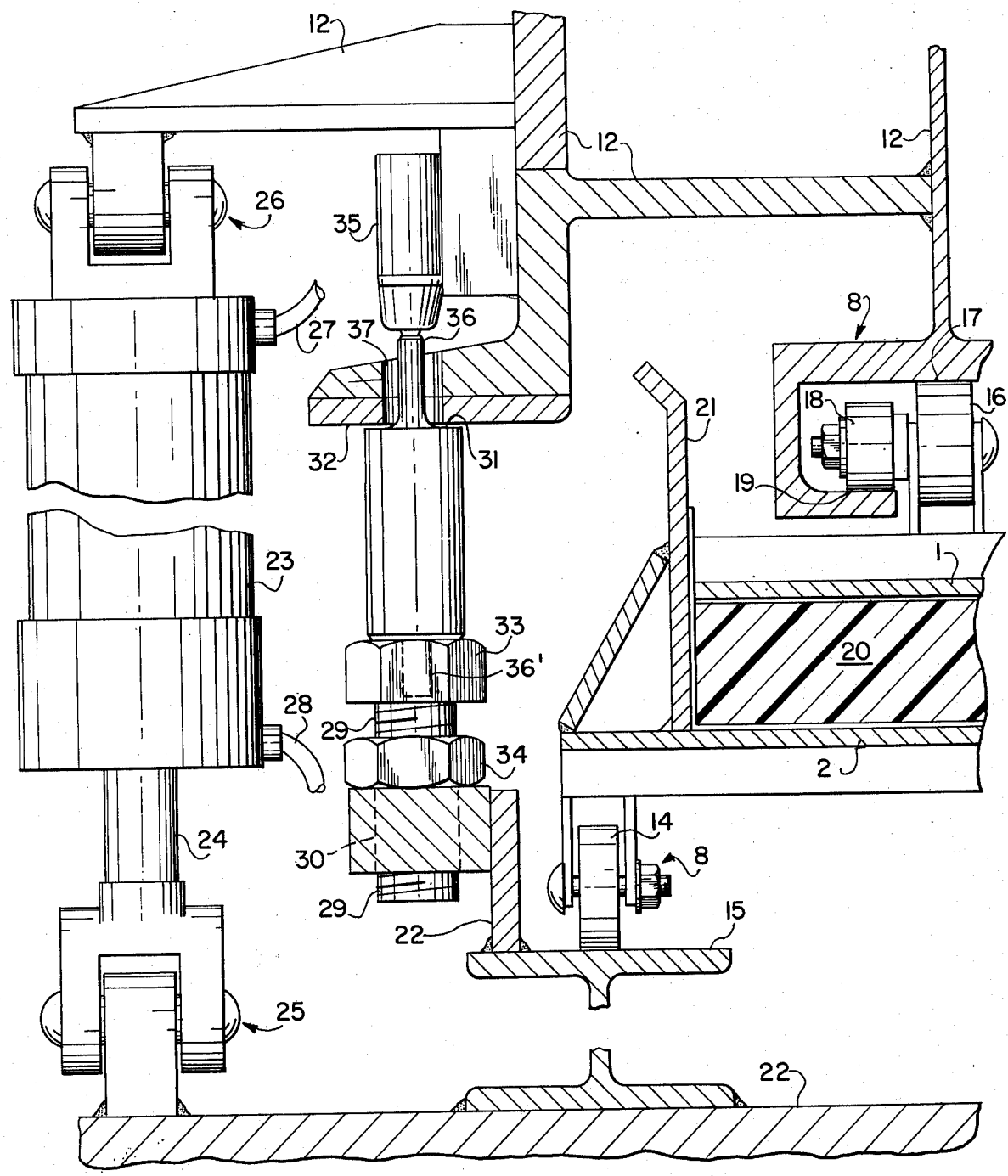
FIG. 2 is a detailed, partial, cross-sectional view taken along line II—II FIG. 1.

The details of the conveyor structure and the support structure are shown in FIG. 2.

In FIG. 2, the lower conveyor belt 2, is constructed of a plurality of rigid metal plates hingedly interconnected together in an endless chain and provided with guide and supporting rollers 14 freely rotatably mounted on their back surface for engagement with stationary tracks 15, all as more clearly described in the above-mentioned Kornylak patent. The upper endless conveyor belt 1 has a similar structure, with guide rollers 16 engaging a downwardly facing stationary rail surface 17 and guide rollers 18 engaging an upwardly facing stationary rail surface 19. The anti-friction guide and support means 14–19 correspond to the anti-friction means 8 of FIG. 1. The opposing surfaces of the conveyors 1 and 2 may be lined or not and form therebetween a molding zone for the foaming and curing of a synthetic rigid foam material 20. The sides of the molding zone may be enclosed by separate endless conveyors, or as shown by a rigid side wall 21 carried by one of the conveyors, particularly carried by the lower conveyor 2.

In FIG. 2, only one side is shown, since the other side is preferably a mirror image, and the cross-section shown is representative of the cross-sections along the extent of the molding zone.

As previously described, the upper conveyor is carried by a support frame 12. The lower conveyor 2 is carried by a support frame 22, which is preferably stationarily mounted. On each side of the molding zone, a plurality of expansible chamber means are longitudinally spaced from each other, for example they may be spaced 5 feet apart for a 40 foot conveyor, and each of the sections 12 are provided with at least one expansible chamber on each side of the molding zone. One of the expansible chambers is shown in FIG. 2 as comprising a fluid cylinder 23 carrying therein a double acting piston (not shown), which is rigidly secured to a piston rod 24. By a suitable horizontal pivot-pin connection 25, the piston rod 24 is drivingly connected to the support frame 22, and by a similar horizontal pivot-pin connection 26, the cylinder 23 is drivingly connected to the support frame 12. A conventional type of fluid coupling 27 will supply pressurized fluid to the top of the cylinder 23 for expanding the expansible chamber means to drive the support frames 12 and 22 vertically away from each other, and a similar fluid coupling 28 is provided to conduct pressurized fluid into the lower portion of the cylinder 23 to drive the frames 12 and 22 toward each other. Since all of the expansible chambers are substantially identical, only one has been described in detail.

To determine the minimum spacing between the support frames 12 and 22, and correspondingly the minimum spacing between the conveyors 1 and 2 within the molding zone, there are provided a plurality of spacers, and preferably one spacer is provided adjacent to each of the expansible chamber means 23–28. Since the spacer means are substantially identical, only one will be described in detail with respect to FIG. 2. The spacer includes a rigid block having a threaded shaft 29, which is screwed into a correspondingly threaded vertically extending bore 30 within the support frame 22. The opposite end of the spacer block is provided with an upwardly extending annular abutment surface 31 that engages a downwardly facing abutment surface 32 of the support frame 12. With such an arrangement, it is seen that as the shaft 29 is screwed into and out of the bore 30, the support frames 12 and 22, and correspondingly the conveyors 1 and 2, will move closer together and further apart, respectively. To assist in this adjustment, the spacer block is provided with a wrench engaging portion 33. A locknut 34 is threadibly received on the shaft 29, so that it may lock the shaft in its adjusted position with respect to the support frame 22.

As a part of the control system, a sensor is preferably provided for each one of the spacers, to indicate when the spacers are engaged, or close to engagement. Since these sensors are substantially identical, only one will be described in detail with respect to FIG. 2. The sensor includes a micro-switch 35 that is rigidly mounted on the support frame 12, although this rigid mounting may have vertical adjustment. An actuating pin 36 is integrally connected with the spacer block shaft 29 for operative engagement with the micro-switch 35. As shown, the support frame 12 is provided with an aperture 37, through which extends the actuating pin 36.

Figure 3:
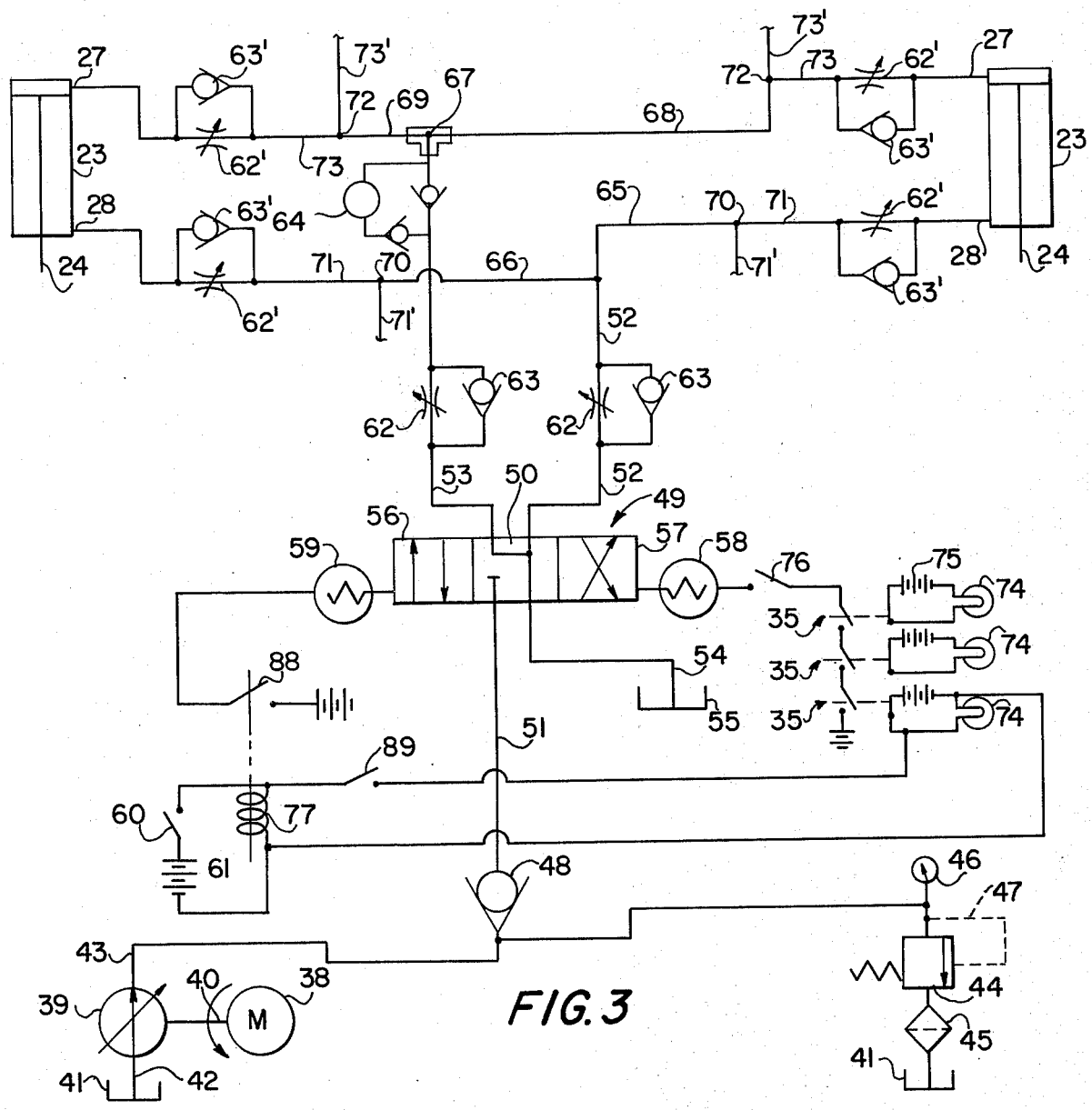
FIG. 3 is a schematic of the hydraulic control circuit and the electrical control circuit of the present invention.

In the schematic control circuit of FIG. 3, only one expansible chamber means 23, 24 is shown for one side of the molding zone and only one expansible chamber means 23, 24 is shown for the other side of the molding zone, although it is understood that a plurality of such expansible chamber means will be provided for each side, as described above. Correspondingly, only three of the micro-switches 35 have been shown in the schematic, although it is understood that preferably a plurality are provided corresponding to the expansible chamber means.

In FIG. 3, an electric motor 38 drives a pump 39 by means of an interconnecting shaft 40. The pump 39 is a variable pressure, variable capacity pump, wherein preferably the pressure of the pump may be set at a desired level and the capacity or flow of the pump will vary between full capacity and zero flow as the demand for pressurized fluid fluctuates. The pump 39 will draw fluid, preferably hydraulic fluid from a reservoir 41 through an intake line 42 and discharge the fluid at the desired high pressure to discharge line 43. A conventional pressure regulator 44 is fluid connected to line 43, for dumping fluid into a reservoir 41 through a filter 45, when the pressure exceeds the desired level. A suitable gage 46 is preferably provided to show the actual pressure of the control circuit, and a selective by-pass 47 may be provided for the pressure regulator 44. As a result, pressurized fluid will be provided to flow through the check valve 48 in a direction away from the pump 39 according to demand between full flow and zero flow, while the check valve 48 will prevent return of the fluid in the opposite direction.

The fluid control circuit further includes a three-way valve 49, which may be a slide block valve having a normal position wherein a block 50 will prevent the flow of fluid through line 51 downstream from the check valve 48, and further connect main control lines 52, 53 commonly to an exhaust line 54 leading to a storage reservoir 55 at low pressure. A second block 56 of the three-way valve will connect the main control line 53 to the high pressure line 51, and further connect the main control line 52 to the low pressure exhaust line 54. The remaining block 57 of the three-way valve will connect the main control line 53 to the exhaust line 54, and further connect the main control line 52 to the high pressure line 51. A conventional solenoid 58 is provided to change the valve from its indicated position to a position wherein block 57 is in circuit, and a conventional solenoid 59 with a control switch 60 and power source 61 will change the three-way valve from its indicated position to a position wherein the block 56 is in circuit.

Preferably, only one main control line 52 is provided and only one main control line 53 is provided, although the system may be subdivided with several of each type of the main control lines each supplying more than one expansible chamber. Each of the main control lines 52, 53 is provided with a restrictive orifice 62 and a check valve 63 in parallel with each other so as to provide unobstructed fluid flow away from the valve 49, and restricted fluid flow towards the valve 49. Preferably, each of the orifices 62 is adjustable as to its pressure drop. The main pressure line 53 has a flow divider 67 provided with one line 68 leading to the one side of the molding zone and a second line 69 leading to the other side of the molding zone. The flow divider is reversible thus serving both sides of the circuit.

Line 65 has a distributor 70 provided with a plurality of lines 71, 71', etc., which correspond to the number of expansible chambers on the one side of the molding zone, and the line 68 has a flow distributor 72 provided with a plurality of lines 73, 73', etc., which corresponds to the number of expansible chambers on the one side of the molding zone. Each of the lines 71, 71', etc. and each of the lines 73, 73' etc. is provided with an identical flow control unit consisting of a check valve 63' and a variable restriction orifice 62', which are respectively identical in construction, function and circuit arrangement as the previously mentioned elements 62, 63, that is, they will provide for the unobstructed flow of fluid to their respective expansible chamber and the restricted flow of fluid away from their respective expansible chambers. The variable restriction orifices may be individually adjusted so as to balance the chamber exhaust for the various chambers. The flow control structure for the other side of the molding zone is identical to that described above, with respect to the one side of the molding zone, and therefor will not be described further in detail.

When the switch 60 is closed to energize the solenoid 59 and move the block 56 into circuit, pressurized fluid will flow from line 51 through block 56, through line 53, through check valve 63, and be divided at 67 between lines 68 and 69, where the fluid will further be subdivided by distributors 72 to the plurality of lines 73, 73', ect. (which correspond to the number of expansible chambers); for each of the expansible chambers, the pressurized fluid will then travel through its respective check valve 63' and fluid coupling 27 to move the support frames 12 and 22 apart from each other and correspondingly move the conveyors 1 and 2 apart from each other for purposes of inspection, maintenance and the like. Simultaneously, the block 56 will place the opposite side of the expansible chambers into communication with the sump for exhausting their fluid through couplings 28, variable orifices 62', lines 71, distributors 70, lines 65, 66, main line 52, orifice 62, block 56, and exhaust lines 54.

When it is desired to move the conveyors together for molding, the switch 60 is opened to de-energize the solenoid 59 and return the block 50 into circuit. If the upper conveyor is the moveable conveyor, the weight of the conveyor and its support frame will move it downwardly so that fluid will be exhausted from the expansible chambers through couplings 27 and drawn into the expansible chambers through couplings 28, to and from the sump, respectively. The fluid drawn into couplings 28 will be freely drawn from the sump through check valves 63, 63', but the fluid exhausted through couplings 27 must pass through restrictive orifices 62, 62', which will control the descent rate of the upper conveyor for a desired safe descent speed.

Since the lines 52 and 53 are interconnected by the block 50, the fluid will effectively travel from one side of the piston to the opposite side of the piston with bleed restriction, as the upper conveyor is lowered by gravity at the desired rate. A flow responsive switch 64 is inserted in line 53 with check valves as indicated to only sense the descent of the upper conveyor and operate an alarm as indicated in FIG. 3.

When the upper conveyor has descended to where it has reached its minimum spacing with respect to the lower conveyor, or almost reached such minimum spacing, the actuating pin 36 will engage the microswitch 35, as explained above with respect to FIG. 2, to produce an engagement signal, which may be designed to be produced with at least near engagement, that is, when the spacer blocks actually engage or when they are very close to engagement. As shown in FIG. 3, each of the switches 35 is in circuit with an indicator, preferably a light on a control panel, and a source of power, so that the engagement signal will turn off the lamp 74 corresponding to the switch 35 that has been actuated, and from the control panel, the sequence and extent of spacer block engagement may be determined. If one spacer block is engaging considerably sooner than the remaining spacer blocks during descent, the variable orifice 62' associated therewith may be adjusted to increase the restriction and thus the descent may be balanced along the entire conveyor. Further, if a lump or other obstruction, or the like, produces a localized abnormal pressure, greater than that of the combined effect of the upper conveyor and support weight and the associated expansible chambers under clamping pressure (which clamping pressure is produced when block 57 is in position), the upper or lower conveyor, or both, will locally yield at this place of abnormal pressure, which yielding will be sensed by the associated switch 35 to turn on its associated light 74, and the associated light 74 at the control panel will pinpoint the location of the problem. Of course, the lights may turn on where they have previously been described as turning off, and correspondingly the switches may have a normally closed position rather than a normally opened position. Further, the switches may have lost motion so that the engagement signal, which may be the presence of an actual electrical signal or the absence of an actual electrical signal, may be initiated at a particular spacing between the conveyors during closing of the conveyors and the engagement signal may be discontinued at a different spacing, due to lost motion, electrical delays, or the like, during moving of the conveyors apart.

During lowering of the upper conveyor structure, it is seen that all of the switches 35 must be closed by the actuating pin 36 of FIG. 2 before the solenoid 58 may be energized by its control switch 76 to move the block 57 into circuit to apply clamping pressure to the conveyors. This is a safety feature, since if the clamping pressure were applied to expansible chambers considerably before the spacer blocks were engaged, the heavy structure of the upper conveyor and its associated support frame would be driven at a considerable speed towards the lower conveyor and place considerable stresses on the materials which may damage them, and further pose a considerable safety hazard to anyone in the area.

With the block 57 in circuit to apply clamping pressure, the full fluid pressure within line 51 will be supplied to line 52 and ultimately to all of the couplings 28 through the respective check valve 63, 63' to hold the conveyors together under a pressure to resist the considerable foaming pressure of the product within the molding zone. Thus during molding, the conveyors will be held at a minimum distance as determined by the spacers and they will resist separation due to the molding pressure by a force equal to the combined effects of the weight of the upper conveyor and support frame and the clamping pressure of all of the expansible chambers. The clamping pressure is determined by the set pressure of the pump 39.

As mentioned previously, when an abnormal pressure, either localized or generalized in the molding zone overcomes the combined effect of the above-mentioned conveyor structure weight and clamping pressure, the conveyors will separate to correspondingly disengage the actuating pin 36 from the micro-switch 35 and discontinue the engagement signal. This discontinuation of the engagement signal may be localized due to distortion of the frame at a corresponding locality of the abnormality or as previously mentioned the support frame for the upper conveyor may be constructed in relatively moveable sections to more readily localize this yielding upon localized abnormal pressures within the molding zone. As previously mentioned, the abnormality may be pinpointed by the indicators 74 with respect to location. Further, the abnormal pressure will open up the power supply line to the solenoid 58 either at the same time as operating the indicator 74, or before or after as provided by suitable delays. In any event, de-energization of the solenoid 58 will return the spool 50 to the circuit for venting the expansible chambers and relieving the clamping pressure. Simultaneously, or upon even further overloading due to abnormal pressures, the solenoid 59 may be actuated to move the block 56 into circuit and raise the conveyors to their full maximum spacing where they will stay, until the problem is corrected and the operation above-mentioned repeated.

To accomplish raising of the upper conveyor upon substantial overload, the control circuitry may take on many different forms. For example, if it is desired to actuate the solenoid 59 simultaneously with energizing anyone of the indicator lights 74, the following structure may be employed, which will be described with respect to the lower one of the indicator lights, shown in FIG. 3, although it is understood similar circuitry will be provided independently for the other lights so that upon overload only one light would be energized even though the solenoid 59 would be energized for any one of the lights being energized. As mentioned before, the solenoid 59 may be purposely energized by closing switch 60, which would energize a relay 77 to close switch 88 and energize solenoid 59. If the switch associated with the light 74 is normally closed and is opened when minimum conveyor spacing is reached to de-energize the indicator light 74, the closing of the switch on overload will energize the associated light 74 and also place the relay coil 77 in circuit with the associated light power source to close the switch 88 and energize the solenoid 59. Switches 76 and 89 may be tied together for simultaneous actuation, so that the overload feature wherein the 56 will be moved in circuit will only be operative when switch 76 has been closed to normally apply clamping pressure.

While a preferred embodiment of the present invention has been described in detail for the advantages of the specific details and for purposes of illustration, further modifications, embodiments and variations are contemplated according to the broader aspects of the present invention, all as determined by the spirit and scope of the following claims.

What is claimed is:

1. A molding machine comprising an upper endless belt conveyor molding means and lower endless belt conveyor molding means each with a generally linear run parallel to and adjacent each other to form therebetween a molding zone; respective supporting means connected to the two molding means being adjustably mounted towards and away from each other to correspondingly decrease and increase the spacing in the molding zone; drive means connected to both said conveyor molding means for driving said conveyor molding means in the same direction in the molding zone; a plurality of fluid expansible chamber means on each side of the molding zone drivingly connected between the two supporting means adjacent the molding zone; a plurality of spacer means between the supporting means on each side of the molding zone positively limiting the minimum spacing between the supporting means and freely permitting relative movement of the supporting means away from each other; fluid control means in communication with said fluid expansible chamber means for supplying fluid under pressure selectively to said fluid expansible chamber means for clamping said supporting means against said spacer means to maintain the minimum spacing between said molding zones for resisting substantial molding pressure; a plurality of means sensing at least near engagement of said spacer means between the supporting means corresponding generally to the minimum spacing between said supporting means and producing a corresponding engagement indication; and said fluid control means supplying clamping pressure to said expansible chamber means only in response to all said sensing means indicating at least near engagement, and preventing the supplying of clamping pressure to said expansible chamber means when any one of said sensing means indicates there is not at least near engagement.

2. The apparatus of claim 1, wherein each of said spacer means is adjustable to vary its rigid spacing length independently of the other spacer means.

3. The apparatus of claim 2 including hinge means dividing at least one of said supporting means in the direction of the molding zone extent, into a plurality of sections interconnected for relative movement; at least one of said expansible chamber means, said spacer means and sensing means being provided on each side of said support sections.

4. The apparatus of claim 2, wherein each of said spacer means includes a rigid block fixedly secured to one of the supporting means for engagement with the other of the supporting means upon minimum spacing; and said sensing means includes a micro-switch mounted on the other of said supporting means in working engagement with said spacer block in the minimum spacing position.

5. The apparatus of claim 4, wherein each of said spacer blocks has a pin rigidly extending therefrom through an aperture in said other supporting means with a terminal end of said pin engaging said micro-switch in the minimum spacing position, and said spacer block having axial engagement with said other supporting means around said pin.

6. The apparatus of claim 2, wherein said fluid control means includes a variable capacity pump and supplies fluid under constant pressure to said expansible chamber means; a three-way valve in circuit between said pump and said expansible chamber means, and having a first position for supplying fluid under pressure to one side of each of said expansible chamber means and venting the other side to move said molding means apart, a second position for supplying fluid under pressure to the other side of said expansible chamber means and venting said one side to clamp the molding means together, and a third position for venting each side of each said expansible chamber means to permit the molding means to move together.

7. The apparatus of claim 6, including a fluid pressure restricting orifice in parallel with a check valve inserted between each side of each of said expansible means and said three-way valve for freely permitting flow through said check valve means to said expansible chamber means, and restricting flow from said expansible means through said orifice to said three-way valve means.

8. The apparatus of claim 7, wherein each of said spacer means includes a rigid block fixedly secured to one of the supporting means for engagement with the other of the supporting means upon minimum spacing; said sensing means includes a micro-switch mounted on the other of said supporting means in working engagement with said spacer block in the minimum spacing position; and each of said spacer blocks having a pin rigidly extending therefrom through an aperture in said other supporting means with a terminal end of said pin engaging said micro-switch in the minimum spacing position, and said spacer block having axial engagement with said other supporting means around said pin.

9. The apparatus of claim 7, including hinge means dividing at least one of said supporting means, in the direction of the molding zone extent, into a plurality of sections interconnected for relative vertical movement; at least one of said expansible chamber means, said spacer means and sensing means being provided on each side of each said support sections.

10. The apparatus of claim 1, wherein each of said spacer means includes a rigid block fixedly secured to one of the supporting means for engagement with the other of the supporting means upon minimum spacing; said sensing means includes a micro-switch mounted on the other of said supporting means in working engagement with said spacer block in the minimum spacing position; each of said spacer blocks has a pin rigidly extending therefrom through an aperture in said other supporting means with a terminal end of said pin engaging said micro-switch in the minimum spacing position, and said spacer block having axial engagement with said other supporting means around said pin.

11. The apparatus of claim 1, wherein said fluid control means includes a variable capacity means for supplying fluid under constant pressure to said expansible chamber means; a three-way valve in circuit between said pump and said expansible chamber means, and having a first position for supplying fluid under pressure to one side of each of said expansible chamber means and venting the other side to move said molding means apart, a second position for supplying fluid under pressure to the other side of said expansible chamber means and venting said one side to clamp the molding means together, and a third position for venting each side of each said expansible chamber means to permit the molding means to move together.

12. The apparatus of claim 11, including a fluid pressure restricting orifice in parallel with a check valve inserted between each side of each of said expansible means and said three-way valve for freely permitting flow through said check valve means to said expansible chamber means, and restricting flow from said expansible means through said orifice to said three-way valve means.

13. A molding machine comprising: an upper endless belt conveyor molding means and lower endless belt conveyor molding means each with a generally linear run parallel to and adjacent each other to form therebetween a molding zone; respective supporting means connected to the two molding means being adjustably mounted towards and away from each other to correspondingly decrease and increase the spacing in the molding zone; drive means connected to both said conveyor means driving said conveyor means in the same direction in the molding zone; a plurality of spacer means between the supporting means on each side of the molding zone positively limiting the minimum spacing between the supporting means and freely permitting relative movement of the supporting means away from each other; a plurality of fluid expansible chamber means on each side of the molding zone drivingly connected between the two supporting means adjacent the molding zone; fluid control means in communication with said fluid expansible chamber means for supplying fluid under pressure selectively to said fluid expansible chamber means for clamping said supporting means against said spacer means; each of said expansible chamber means being double acting with one expansible chamber being pressurized to move said supporting means away from each other when supplied with fluid under pressure and the other expansible chamber clamping said supporting means against said spacer means when supplied with fluid pressure; said fluid control means including three-way valve means in fluid circuit with said expansible chamber means, and having a first position for supplying fluid under pressure to said one expansible chamber while venting the other expansible chamber, a second position for supplying fluid under pressure to the other expansible chamber while venting the one expansible chamber, and a third position for venting each of said expansible chambers to permit the molding means to move together by gravity; and a fluid pressure restricting orifice in parallel with a check valve inserted between at least one of said expansible chambers and said valve so as to freely permit the flow of fluid from said valve through said check valve means to said at least one expansible chamber, and so as to restrict the flow of fluid from said at least one expansible chamber through said orifice to said valve to control the gravity movement of said supporting means towards each other in the third position of said valve.

14. The apparatus of claim 13, wherein each of said spacer means is adjustable to vary its rigid spacing length independently of the other spacer means.

15. A molding machine comprising: an endless belt conveyor molding means and lower endless belt conveyor molding means each with a linear run parallel to and adjacent each other to form therebetween a molding zone; respective supporting means connected to the two molding means being adjustably mounted towards and away from each other to correspondingly decrease and increase the spacing in the molding zone; means connected to both said conveyor means driving said conveyor means in the same direction within the molding zone; a plurality of spacer means between the supporting means on each side of the molding zone positively limiting the minimum spacing between the supporting means and freely permitting relative movement of the supporting means away from each other a plurality of fluid expansible chamber means on each side of the molding zone drivingly connected between the two supporting means adjacent the molding zone; fluid control means in communication with said fluid expansible chamber means for supplying fluid under pressure selectively to said fluid expansible chamber means for clamping said supporting means against said spacer means; each of said expansible chamber means being double acting with one expansible chamber being pressurized to move said supporting means away from each other when supplied with fluid under pressure and the other expansible chamber clamping said supporting means against said spacer means when supplied with fluid pressure; said fluid control means including a three-way valve in fluid circuit with said expansible chamber means, and having a first position for supplying fluid under pressure to said one expansible chamber while venting the other expansible chamber, a second position for supplying fluid under pressure to the other expansible chamber while venting the one expansible chamber, and a third position for venting each of said expansible chambers to permit the molding means to move together by gravity; means sensing at least near engagement of said spacer means between the supporting means corresponding generally to the minimum spacing between said supporting means and producing a corresponding electric signal; and means responsive to said electric signal to visually indicate, at a location remote from said sensing means, the at least near engagement.

16. A molding machine, comprising: an upper endless molding belt conveyor means and lower endless molding conveyor means adjacent each other to form therebetween a molding zone; each of said endless molding belt conveyor means having a generally linear run parallel to and adjacent the corresponding linear run of the other endless conveyor molding means in the molding zone; drive means connected to both said conveyor means linearly driving said endless conveyor means in the same direction within the molding zone; respective support means connected to the two molding conveyor means being adjustably mounted towards and away from each other to correspondingly decrease and increase the spacing in the molding zone; a plurality of expansible means on each side of the molding zone drivingly connected between the two supporting means adjacent the molding zone; a plurality of spacer means between the supporting means on each side of the molding zone and being completely separate from said expansible means for positively limiting the minimum spacing between the supporting means and freely permitting relative movement of the supporting means away from each other; control means in communication with said expansible means for engaging said supporting means against said spacer means to maintain the minimum spacing between said molding zones during molding; each of said spacer means having means infinitely adjustable to vary its rigid spacing length within a predetermined substantial range independently of the other spacer means, and a spacer gauge block separate and removeable from said adjustable means, which gauge block is identical with the gauge blocks for the other spacer means, and is provided with mounting means to secure it between one of the supporting means and the adjacent adjustable means so that the effective spacing length of each spacing means is the sum of the fixed identical spacing length for each spacing gauge block and the independently adjusted spacing length of its adjustable means so that said adjustable means may be independently adjusted to establish true parallelism between the linear runs of said endless conveyor means within the molding zone, and said mounting means used to secure a set of identical spacing gauge blocks to determine a predetermined spacing corresponding to the gauge blocks, which predetermined spacing for molding may be selectively stepwise changed by substituting a separate set of gauge blocks identical to each other and of a different effective spacing length than the first set of gauge blocks.

17. Apparatus of claim 16, wherein said mounting means includes pin and mating recess means between each of said gauge blocks and the adjacent one of said supporting means and adjustable means, and each of said gauge blocks further having an annular abutment surface for engaging the adjacent one of said supporting means and adjustable means entirely around said pin means upon assembly of said pin and recess means at one end of the gauge block.

18. The apparatus of claim 17, further including a pin and recess means on the opposite side of each of said gauge blocks from said first mentioned pin and recess means for engaging only upon minimum spacing, and a microswitch rigidly mounted on one of said supporting means positioned to be engaged by the pin of said additional pin and recess means only in the position of minimum spacing.

* * * * *